(12) United States Patent
Govindarajalu et al.

(10) Patent No.: US 11,816,706 B2
(45) Date of Patent: Nov. 14, 2023

(54) INTELLIGENT INTERFACE DISPLAYS BASED ON PAST DATA CORRELATIONS

(71) Applicant: PAYPAL, INC., San Jose, CA (US)

(72) Inventors: Krishnakumar Govindarajalu, San Jose, CA (US); Cynthia L. O'Yang, Sunnyvale, CA (US); Yue Xin, San Jose, CA (US); Tao Sun, Fremont, CA (US); Dharmendra Kumar, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 1356 days.

(21) Appl. No.: 16/236,206

(22) Filed: Dec. 28, 2018

(65) Prior Publication Data
US 2020/0211065 A1 Jul. 2, 2020

(51) Int. Cl.
*G06Q 30/02* (2023.01)
*G06N 20/00* (2019.01)
(Continued)

(52) U.S. Cl.
CPC ......... *G06Q 30/0279* (2013.01); *G06N 20/00* (2019.01); *G06Q 20/085* (2013.01); *G06F 3/0482* (2013.01)

(58) Field of Classification Search
CPC .. G06Q 30/0279; G06Q 20/085; G06N 20/00; G06N 3/006; G06F 3/0482
See application file for complete search history.

(56) References Cited

U.S. PATENT DOCUMENTS 6,092,052 A 7/2000 Ziarno
7,933,027 B1 * 4/2011 Roth ................... G01N 21/3581
356/27

(Continued)

FOREIGN PATENT DOCUMENTS

CN         109789706 A  *  5/2019  ............... B41J 2/135
CN         110290018 A  *  9/2019  ......... G05B 19/4063
WO    WO 2007/079054 A2  *  7/2007

OTHER PUBLICATIONS

Marco Castillo, "Fundraising through online Social Networks: A field experiment on Peer-to-Peer Solicitation", 2014, Journal of Public Economics 114, pp. 29-35. (Year: 2014).*

(Continued)

*Primary Examiner* — Tan D Nguyen
(74) *Attorney, Agent, or Firm* — Haynes and Boone, LLP

(57) ABSTRACT

There are provided systems and methods for intelligent interface displays based on past data correlations. A service provider and/or entity may implement a machine learning engine to dynamically adjust data displayed in interface elements of an interface provided by the service provider or entity. The data may correspond to an amount for a voluntary payment to the entity by a user and may be based on correlating and processing past user transactions and received entity payments. Weights may be applied to the data to determine median, average, and/or quartile amounts based on goals set by the user, events occurring at the time of the voluntary payment, and/or time of year. Once the machine learning engine determines one or more amounts specific to the user's payment to the entity, the engine may adjust or output the interface having the user specific data for processing.

20 Claims, 6 Drawing Sheets

(51) Int. Cl.
*G06Q 20/08* (2012.01)
*G06F 3/0482* (2013.01)
*G06Q 30/0279* (2023.01)

(56) References Cited

U.S. PATENT DOCUMENTS

| | | | |
|---|---|---|---|
| 2009/0276345 A1* | 11/2009 | Hughes | G06Q 20/10 |
| | | | 715/810 |
| 2011/0161119 A1* | 6/2011 | Collins | G06Q 40/08 |
| | | | 705/4 |
| 2011/0213675 A1 | 9/2011 | Friedman | |
| 2014/0164275 A1* | 6/2014 | Lee | G06Q 20/10 |
| | | | 705/329 |
| 2014/0236841 A1* | 8/2014 | Tan | G06Q 30/0279 |
| | | | 705/72 |
| 2015/0006366 A1 | 1/2015 | Sobhani et al. | |
| 2015/0161614 A1* | 6/2015 | Tsing | G06Q 30/0279 |
| | | | 705/44 |
| 2015/0365517 A1* | 12/2015 | Tam | G06Q 50/01 |
| | | | 705/39 |
| 2016/0300218 A1* | 10/2016 | Kuadey | G06Q 20/10 |
| 2017/0344986 A1* | 11/2017 | Shanmugam | G06Q 20/3265 |
| 2019/0188616 A1* | 6/2019 | Urban | G06Q 10/0875 |

OTHER PUBLICATIONS

Vishal Gupta, "A Survey of Text Mining Techniques and Applications", Aug. 2009, Journal of Emerging Technologies in Web Intelligence, vol. 1, No. 1, pp. 60-76. (Year: 2009).*

Itamar Arel, "Deep Machine Learning—A New Frontier in Artificial Intelligence Researc," 2010, University of Tennessee, pp. 1-6. (Year: 2010).*

* cited by examiner a service provider, such as an online transaction and
payment processor, and/or an entity accepting voluntary
payments from users may provide an online portal that can
be accessed through a computing device of a user to process
voluntary payments to the entity. The portal may provide
one or more interfaces displayable by the user's device,
where the interfaces include information, data, and processes within one or more interface elements to inform the
user about the entity, the voluntary payments, and/or allow
the user to enter and/or select an amount to make a voluntary
payment to the entity. For example, a charitable organization
may provide and/or request the service provider to generate
and provide the online portal that allows transaction processing using the service provider for donations to the
charity. Other types of organizations may also allow for
voluntary transactions and payments by users, merchants, or
other entities to provide payments to the entity through the
portal. An interface of the portal may be displayable to view
and/or select what the voluntary payment is being applied to
(e.g., the entity and/or a product, service, or department of
the entity), select or enter an amount for the voluntary
payment, and initiate transaction processing to the entity
through the service provider (e.g., by entering payment or
funding source information, selecting a payment account
and providing authentication information, or otherwise providing personal and/or financial information).

However, interface data provided by the portal may be
static, and therefore a user's device accessing the portal may
only see static data that is not specific to the entity and/or
user. In this regard, static data may not suggest the most
relevant amounts to enter for a voluntary payment and/or
assist the user in entering relevant or preferred data for the
voluntary payment. The entity and/or service provider may
wish to suggest information to the user through the voluntary payment interface based on known data of the entity and
user, which may be weighed based on weights and/or
scoring provided by a machine learning engine. By determining amounts specific for a user to be displayed on the
interface, the entity and/or charity can increase value of
voluntary payments from users to the entity without causing
user experience friction or unnecessary user input and
processing with the entity's portal (e.g., to navigate to
correct portal interfaces to properly process a voluntary
payment). This may reduce the processing requirements,
portal navigations, and interface data displays required by
the portal provided by the service provider's or entity's
server, while reducing transaction processing time and data
input for users.

The service provider may first access entity information
for the entity. The entity data may be used to determine and
display dynamic interface data. The entity data may include
known information for the entity, such as business or charity
information, an employer identification number (EIN) that
may be used to determine that information, and/or account
or entity information stored by the service provider when the
entity registers with the service provider. The entity information may include a transaction history of the entity, such
as a past payment history of voluntary payments received by
the entity from the user and/or other users. For large entities
and/or multi-national entities, the entity information (e.g.,
the transaction history of voluntary payments) may be
specific to a country of origin of the entity and/or of the user,
or may be specific to a smaller region, such as a city, county,
or other municipality. The entity data may also include an
event associated with the particular voluntary payments
being processed through the portal, such as a particular
charitable event or time of year (e.g., Thanksgiving dona-

INTELLIGENT INTERFACE DISPLAYS BASED ON PAST DATA CORRELATIONS

TECHNICAL FIELD

The present application generally relates to intelligently
displaying interface data on computing devices and more
particularly to dynamically adjusting data displayed on
interface elements based on correlating past data for users
and entities.

BACKGROUND

Users may utilize computing devices to perform electronic transaction processing with other devices, such as
voluntary transaction processing with entities. Generally,
entities may provide one or more online portals that output
static interfaces that users may utilize to process data with
the entities, such as transactions and/or voluntary payments.
However, these interfaces include static data, such as one or
more amounts generically suggested to all user that view the
interface. Thus, the data is not dynamically presented to
users based on user and/or entity factors. Additionally, users
may be unaware of particular data that may be useful to
customize their processing with the entity. Therefore, the
users may perform sub-optimal processing with entities
when accessing these static interfaces, and entities may be
unable to communicate more preferred data and options to
the users based on their particular past data and interactions.

Figure 1:
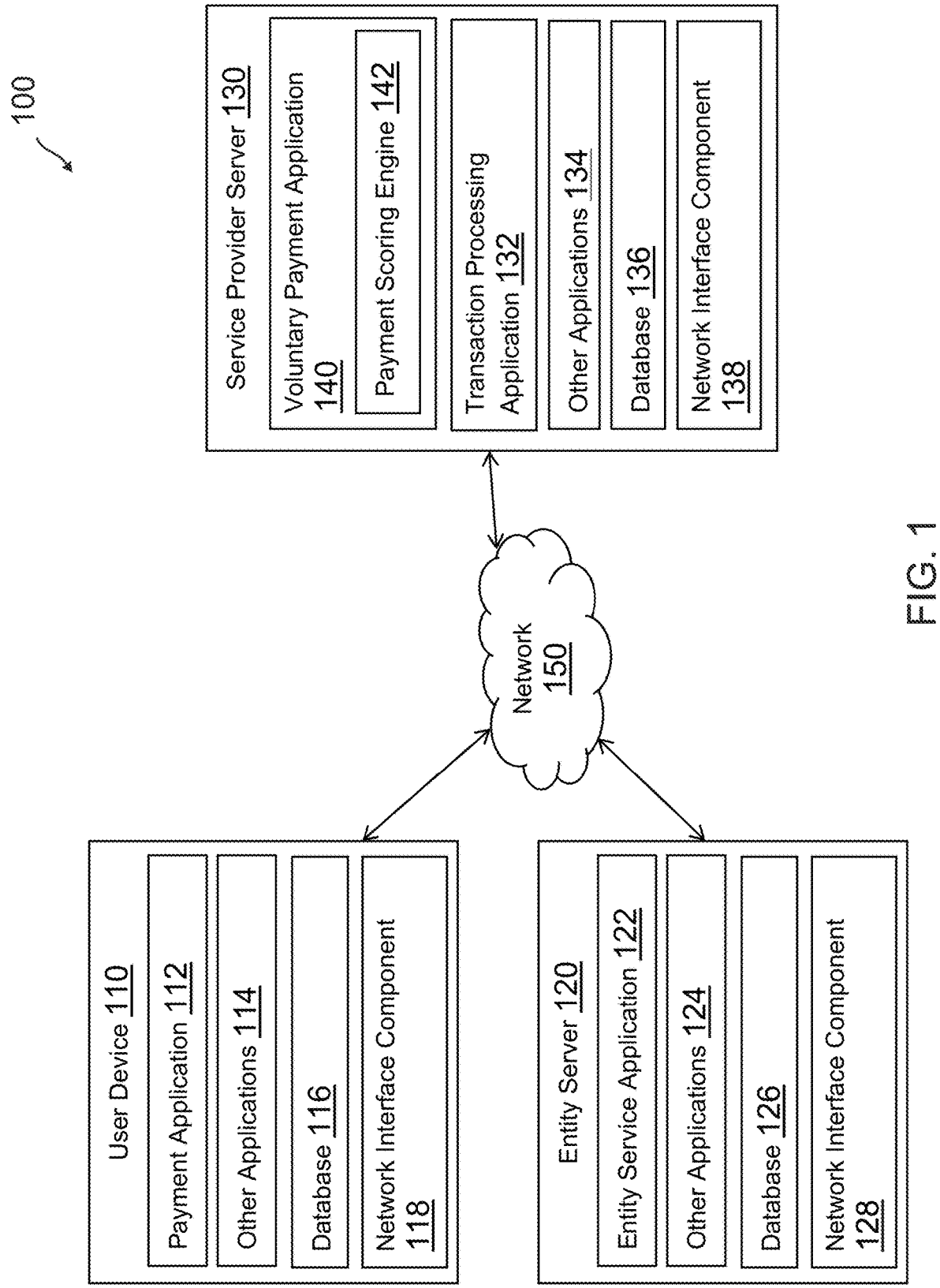
FIG. 1 is a block diagram of a networked system suitable
for implementing the processes described herein, according
to an embodiment.

Embodiments of the present disclosure and their advantages are best understood by referring to the detailed
description that follows. It should be appreciated that like
reference numerals are used to identify like elements illustrated in one or more of the figures, wherein showings
therein are for purposes of illustrating embodiments of the
present disclosure and not for purposes of limiting the same.

DETAILED DESCRIPTION

Provided are methods utilized for intelligent interface
displays based on past data correlations. Systems suitable
for practicing methods of the present disclosure are also
provided.

tions) and/or donations in response to an emergency or disaster. The entity data may also be associated specific groups of users, for example, by limiting the entity information to particular income brackets, such as an income tax bracket associated with the user, or based on specific time frames, such as when a user may have access to more discretionary income or funds. The entity data may be provided to the machine learning engine for processing, as discussed herein.

The service provider may also access user data for the user. The user data may include information specific to the user and may be accessed from an account of the user with the service provider and/or other information available from an online resource in communication with the service provider. This information may include a past voluntary payment history of payments provided by the user through their account to the entity associated with the portal and/or another entity. In some embodiments, this past voluntary payment history may include charitable giving or donations by the user to one or more charities, including the entity. This may be determined from an account and/or transaction history for the user's account, and may also be specific to a time of the payments, an event associated with the payments, and/or an entity type associated with the payments to the entity and/or the other entities. The user's transaction history of past voluntary payments may also include seasonal trends and/or payment trends, such as when the user has previously processed voluntary payments to entities and how much the user provides during those times. The trend data may also be specific to certain types of entities and/or events. In some embodiments, the user data may also include a goal for voluntary payments given by the user over a time period, such as a year, and a remaining amount required for the user to reach that goal. Thus, the entity data and the user data may correspond to proprietary data accessible by the service provider based on transaction processing performed by the service provider.

A processing engine, such as a machine learning engine, of the service provider may utilize the entity data and/or the user data for determination of variable data that may be dynamically displayed in an interface of the entity's voluntary payment portal specifically for the user. For example, the entity data may be processed to determine specific voluntary payment amounts suggested for the user in the interface, such as an average or median amount, an average amount for a first quartile of voluntary payments, and/or an average amount of a third quartile of voluntary payments. The user data may also be processed to determine similar voluntary payment amounts. In some embodiments, the entity and the user data may be processed together and correlated so that similar voluntary payments between the user and the entity may be correlated and used to determine one or more voluntary payment amounts, including based on time of the request or payment. When correlating the data, the service provider's processing engine may look only at similar grouping of transactions depending on the user and entity data and may ignore transactions outside of the user's minimum/maximum spend amount on donations and/or that would widely vary from the user's or entity's typical voluntary payment amounts.

In this regard, the machine learning engine may also remove outliers from the correlated data prior to determining the one or more voluntary payment amounts. The outliers may correspond to amounts higher or lower than a maximum differential from a specific amount or that differ within a set number of standard deviations from a particular mean, median, or quartile average amount. The outliers may also correspond to those above or below a certain amount set by the system or that differ from the user's maximum or minimum spend amount of voluntary payments by a certain percentage or amount. The machine learning engine may also utilize specific weights or scoring for trends based on a time of year or season, such as voluntary payment trends during specific times or seasons by the user and/or other users. Such data may be entity and/or user specific or may be weighed across other entities and users (e.g., all entities/users or entities/users in similar groupings to the entity/user). The machine learning engine may apply weights to determination of the suggested voluntary amounts by weighing the amounts more or less highly depending on the aforementioned data (e.g., by depressing the values in low voluntary payment times or if a user goal is close to being met or by increasing the values during high amounts of voluntary payments or if a goal is far from being acquired and/or almost ended).

After processing the data by the machine learning engine, the machine learning engine may determine one or more amounts specific to the user for display in an interface to process a voluntary payment to the entity. As previously discussed, this may include a median amount from the data. This may also include a first quartile amount and a third quartile amount as a mean or median amount from the first half of the data (e.g., an amount that shows a top 25% donation amount) or a mean or median amount from the second half of the data (e.g., a bottom 75% donation amount). Using this data, the service provider may customize an interface output so that the intelligently determined amounts may be displayed to the user. This dynamic display of data may therefore provide data customized to the entity's and the user's data with the service provider system. The interface may be customized by displaying the amounts on the interface. Additionally, interface elements may be altered or adjusted depending on the amounts. The interface elements may link to one or more processes with the service provider server to process a transaction for the corresponding voluntary payment amount dynamically suggested to the user. The interface may also display additional data regarding the entity, such as a cause for the voluntary payment, an option to delegate the voluntary payment to a specific cause, or other information associated with the voluntary payment. The interface may provide a customizable variable amount that can be entered by the user instead of the intelligently suggested amounts. Additionally, where the user may want to see general amounts preset by the entity and/or service provider, the interface may provide a link or process to revert to a standard voluntary payment interface or webpage.

If the user selects to process a payment to the entity, the user may select the dynamically presented amounts and/or the variable amount and begin electronic transaction processing for the amount. The user may provide user financial or funding source information, or may login to an account with the service provider through authentication information and process the transaction using the account. The online service provider may provide account services to users of the online service provider, as well as other entities requesting voluntary payment portals, which may be used to process electronic transactions. A user wishing to establish the account may first access the online service provider and request establishment of an account. The account may be established by providing account details, such as a login, password (or other authentication credential, such as a biometric fingerprint, retinal scan, etc.), and account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation. Additionally, the online payment provider or other service provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. These accounts may be accessed to determine the user and/or entity data, and may also be used by the users to process transactions based on the dynamically presented data within the voluntary payment interface.

Based on processing the transaction, the machine learning engine may update the entity data, the user data, and/or the one or more weights applied to determination of the voluntary payment amounts dynamically displayed to the user and/or other users. For example, if the user selects a specific suggested amount, the engine may more highly recommend such an amount (e.g., the median amount or first quartile amount). The data may also be updated to reflect the amount, which may affect future amounts determined for the user. Additionally, the service provider system may determine that the user utilizes and/or prefers the dynamically suggested amounts and may continue to present such amounts when the user accesses the same or another voluntary payment portal and/or interface. However, if the user utilizes the variable amount and does not select the dynamically presented amounts, the machine learning engine may defer to a standard interface presentation and may not suggest amounts intelligently determined from the entity and user data.

Thus, a service provide may provide intelligent predictions on interface data for display to a user so that the interface may be customized to particular users and entities. This reduces required user navigations through an online service or resource (e.g., a website or other online platform accessible through an application) in order to locate and process relevant data. Additionally, the user does not need to provide input of data for transaction processing and may view a streamlined version of interface data and processing with the service provider. The service provider may also more quickly perform electronic transaction processing and may provide better results for entities onboarded with the service provider. Further, by suggesting a voluntary payment amount a specific user is likely to find acceptable, the user is more likely to proceed with the transaction, resulting in benefits for both the entity and the user and reduced friction for both the service provider and the user in adjusting or waiting for a payment amount to be entered or selected.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a user device 110, an entity server 120, and a service provider server 130 in communication over a network 150. User device 110 may be utilized by a user to access an interface that allows electronic transaction processing for a voluntary payment to an entity associated with entity server 120. Service provider server 130 may provide optimization of data output on this interface through analysis of data for the user and/or entity, which may be accessed from user device 110, entity server 120, and/or data generated from service provider server 130. Service provider server 130 may implement an engine to determine the data and customize the interface display based on the data.

User device 110, entity server 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented as a communication device that may utilize appropriate hardware and software configured for wired and/or wireless communication with service provider server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

User device 110 of FIG. 1 contains a payment application 112, other applications 114, a database 116, and a network interface component 118. Payment application 112 and other applications 114 may correspond to executable processes, procedures, and/or applications with associated hardware. In other embodiments, user device 110 may include additional or different modules having specialized hardware and/or software as required.

Payment application 112 may correspond to one or more processes to execute software modules and associated devices of user device 110 to process electronic transactions over a network with one or more other services and/or users, including an electronic transaction to an entity associated with entity server 120 for a voluntary payment. In this regard, payment application 112 may correspond to specialized hardware and/or software utilized by a user of user device 110 that may be used to access a website or an interface of the entity and/or service provider server 130 that allows user device 110 to enter or receive transaction data for the voluntary payment, provide an account, financial data, or a digital token used to pay for the transaction data, and instruct service provider server 130 to perform transaction processing. Payment application 112 may utilize one or more user interfaces, such as graphical user interfaces presented using an output display device of user device 110, to enable the user associated with user device 110 to enter and interface data, where the interface data may be customized and dynamically output based on user and entity data. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information (e.g., a website for service provider server 130), presenting the website information to the user, and/or communicating information to the website, including payment information for transaction processed through service provider server 130. However, in other embodiments, payment application 112 may include a dedicated application of service provider server 130 or other entity (e.g., a merchant), which may be configured to assist in processing transactions electronically, including transactions processed using the digital token. The interface(s) providing by payment application 112 may be utilized to engage in electronic transaction processing for the voluntary payment.

Payment application 112 may be used to provide information for the user, which may include transaction histories for the user of voluntary payments, purchases, and other transactions processed using an account of the user. During transaction processing, payment application 112 may be utilized to select payment instrument(s) for use in providing payment for a purchase transaction, transfer, or other financial process. As discussed herein, payment application 112 may utilize user financial information, such as credit card data, bank account data, or other funding source data, as a payment instrument when providing payment information. Additionally, payment application 112 may utilize a digital wallet stored with an account with a payment provider, such as service provider server 130, as the payment instrument, for example, through accessing a digital wallet or account of a user with service provider server 130 through entry of authentication credentials and/or by providing a data token that allows for processing using the account. Payment application 112 may also be used to receive a receipt or other information based on transaction processing.

In various embodiments, user device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 150, or other types of applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of user device 110, such as display components capable of displaying information to users and other output components, including speakers.

User device 110 may further include database 116 stored on a transitory and/or non-transitory memory of user device 110, which may store various applications and data and be utilized during execution of various modules of user device 110. Database 116 may include, for example, identifiers such as operating system registry entries, cookies associated with payment application 112 and/or other applications 114, identifiers associated with hardware of user device 110, or other appropriate identifiers, such as identifiers used for payment/user/device authentication or identification, which may be communicated as identifying the user/user device 110 to service provider server 130. Moreover, database 116 may include user data necessary to determine an interface displayed by payment application 112.

User device 110 includes at least one network interface component 118 adapted to communicate with entity server 120 and/or service provider server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Entity server 120 may be maintained, for example, by an entity that accepts voluntary payments from other users, including user device 110. In this regard, entity server 120 includes one or more processing applications which may be configured to interact with user device 110 and/or service provider server 130 to process a transaction for a voluntary payment. In some embodiments, entity server 120 may be maintained by or include another type of service provider, which may provide data for an entity that receives voluntary payments from users.

Entity server 120 of FIG. 1 contains an entity application 122, other applications 124, a database 126, and a network interface component 128. Entity application 122 and other applications 124 may correspond to executable processes, procedures, and/or applications with associated hardware. In other embodiments, entity server 120 may include additional or different software as required.

Entity application 122 may correspond to one or more processes to execute modules and associated devices of entity server 120 to provide a convenient interface to permit an entity for entity server 120 to view and/or process voluntary payments from user device 110 through a user interface provided by entity application 122 and/or service provider server 130. In this regard, entity application 122 may correspond to specialized hardware and/or software utilized by entity server 120 that may provide transaction processing for voluntary payments. Thus, entity application may be implemented as an application that provides data for entity information and amounts for processing a voluntary payment to the entity. Entity application 122 may provide the interface data, which may be dynamically determined for particular users and entities based on their corresponding data. Once an amount for the voluntary payment has been selected or entered, a transaction may be engaged with the user to complete payment for the selected items. Thus, entity application 122 may request payment for the voluntary payment amount. Transaction processing to receive a payment may be processed by service provider server 130, which may process financial information for the user to provide payment for the transaction to an account of the merchant. Entity application 122 may alert the entity when payment for the transaction is completed and may provide a transaction history to user device 110 for generating a receipt to the user associated with the transaction.

Entity server 120 includes other applications 124 as may be desired in particular embodiments to provide features to entity server 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a merchant to send and receive emails, calls, texts, and other notifications through network 150. In various embodiments, other applications 124 may include financial applications, such as banking, online payments, money transfer, or other applications associated with a payment provider, such as entity server 120. Other applications 124 may contain software programs, executable by a processor, including a graphical user interface (GUI) configured to provide an interface to the user.

Entity server 120 may further include database 126 which may include, for example, identifiers such as operating system registry entries, cookies associated with entity application 122 and/or other applications 124, identifiers associated with hardware of entity server 120, or other appropriate identifiers, such as identifiers used for payment/user/device authentication or identification. Identifiers in database 126 may be used by a payment/service provider to associate entity server 120 with a particular account maintained by the payment/service provider. Database 126 may also further store entity information used to determine a suggested voluntary payment amount.

Entity server 120 includes at least one network interface component 128 adapted to communicate with user device 110 and/or service provider server 130 over network 150. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide processing of transactions for voluntary payments, which may include amounts dynamically suggested to users based on user and entity data. In this regard, service provider server 130 includes one or more processing applications which may be configured to interact with user device 110 and/or entity server 120 to access user and entity data, determine dynamically suggested amounts using a machine learning engine, and process a transaction for the suggested amounts or another amount entered by a user. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes a voluntary payment application 140, a transaction processing application 132, other applications 134, a database 136, and a network interface component 138. Transaction processing application 132, other applications 134, and voluntary payment application 140 may correspond to executable processes, procedures, and/or applications with associated hardware. In other embodiments, service provider server 130 may include additional or different modules having specialized hardware and/or software as required.

Voluntary payment application 140 may correspond to one or more processes to execute modules and associated specialized hardware of service provider server 130 to determine voluntary payment amounts dynamically output to users based on particular user and entity data. In this regard, voluntary payment application 140 may correspond to specialized hardware and/or software to first access entity data for an entity associated with entity server 120. The entity data may include a transaction history of voluntary payments made from users to the entity, including a number, amount, time, and event associated with providing the voluntary payment to the entity. The entity data may be specific to particular locations for users and/or the entity, as well as group of users (e.g., by income, past giving histories, etc.). The entity data may also include an event associated with making a voluntary payment to the entity. Voluntary payment application 140 may also access user data, which may include a transaction history for the user. The transaction history may include voluntary payment amounts to the entity and/or other entities by the user. The user data may be limited or associated with a time period, an event, and/or a goal for voluntary payments made by the user. The user data may also include trends of voluntary payments by the user. In some embodiments, the entity data and the user data may correspond to transaction data available to service provider server 130 from transaction processed by transaction processing application 132 from users to entities for voluntary payments.

Once the data is accessed, voluntary payment application 140 may execute payment scoring engine 142 to intelligently determine voluntary payment amounts displayed in an interface to process an amount to the entity. Payment scoring engine 142 may determine one or more amounts based on combining and correlating the amounts of voluntary payments made by the user and those made to the entity by the user and other users. Payment scoring engine 142 may also remove any outliers that exceed a maximum or minimum amount. The outliers may be determined based on being a number of standard deviations different than the mean or median of the amounts, or may otherwise be excluded based on a difference or dispersion value from the other data points within the entity and user data. Payment scoring engine 142 may also implement one or more weights that consider certain transaction amounts in the data more or less based on trend data, time of year, goals for voluntary payments by the user, an event associated with the voluntary payment, and/or other information that may make particular voluntary payments more or less likely based on a parameter surrounding the voluntary payment and/or the user and entity data.

Once the data is combined, correlated, and weighed payment scoring engine 142 may determine one or more suggested amounts to display to the user to make a voluntary payment, where the amount(s) are dynamically determined for particular users and entities. The amount(s) may correspond to a mean or median amount of the data. The amount(s) may also correspond to a subset of the data, such as a first quartile amount for the data (e.g., a top 25% amount) and/or a third quartile amount (e.g., a bottom 25% amount or amount that corresponds to an amount that is in the last quarter of the data). Payment scoring engine 142 may also determine other amounts (e.g., a top/bottom one-third amount, or more than 3 amounts). The amounts may also be specific to the user, such as if the user has previously picked a certain amount when providing voluntary payments. Once the amounts are determined, voluntary payment application 140 may output the amounts in an interface by dynamically changing and/or updating the interface with the amounts. Voluntary payment application 140 may output the amounts on the interface, or may enter the amounts to one or more interface elements (e.g., fields) of the interface. The interface may also include selectable options and data input fields used to select a suggested amount and process a transaction for the amount using transaction processing application 132 and/or enter a different amount for the suggested amount.

Transaction processing application 132 may correspond to one or more processes to execute modules and associated specialized hardware of service provider server 130 to process a transaction for a voluntary payment amount based on an interface dynamically displayed by voluntary payment application 140. In this regard, transaction processing application 132 may correspond to specialized hardware and/or software used by a user associated with user device 110 and/or an entity associated with entity server 120 to establish a payment account, which may be used to generate and provide user data for the user and entity data for the entity. In various embodiments, financial information may be stored to the account, such as account/card numbers and information. The digital token may be used to send and process payments, for example, through an interface displaying dynamically suggested amounts, and processing a payment using the financial information. In some embodiments, the financial information may also be used to establish a payment account. The payment account may be accessed and/or used through a browser application and/or dedicated payment application executed by user device 110 and/or entity server 120, and engage in transaction processing through transaction processing application 132.

In some embodiments, user device 110 and/or entity server 120 may generate transaction data and may communicate with transaction processing application 132 to process the transaction based on options and/or input to a dynamically displayed interface based on user and entity information. Transaction processing application 132 may retrieve the financial information and may process a payment using the financial information to an account of the merchant associated with entity server 120. Transaction processing application 132 may process the payment and may provide a transaction history to user device 110 and/or entity server 120 for transaction authorization, approval, or denial. Transaction processing application 132 may also update any user and/or entity data based on processing the transaction, which may be used to adjust and further determine any suggested amounts for future voluntary payments.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing service provider server 130, where the user or other users may interact with the GUI to more easily view and communicate information. In various embodiments, other applications 134 may include additional connection and/or communication applications, which may be utilized to communicate information to over network 150.

Additionally, service provider server 130 includes database 136. Database 136 may store various identifiers associated with user device 110. Database 136 may also store account data, including payment instruments and authentication credentials, as well as transaction processing histories and data for processed transactions. Database 136 may store financial information and tokenization data. Database 136 may further store data necessary for payment scoring engine 142 of voluntary payment application 140 to determine one or more amounts suggested for voluntary payments. For example, user and entity data may be stored to database 136, as well as other trends, goals, weights, and/or additional information necessary to determine the amounts dynamically when a user accesses an interface.

In various embodiments, service provider server 130 includes at least one network interface component 138 adapted to communicate user device 110, entity server 120, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
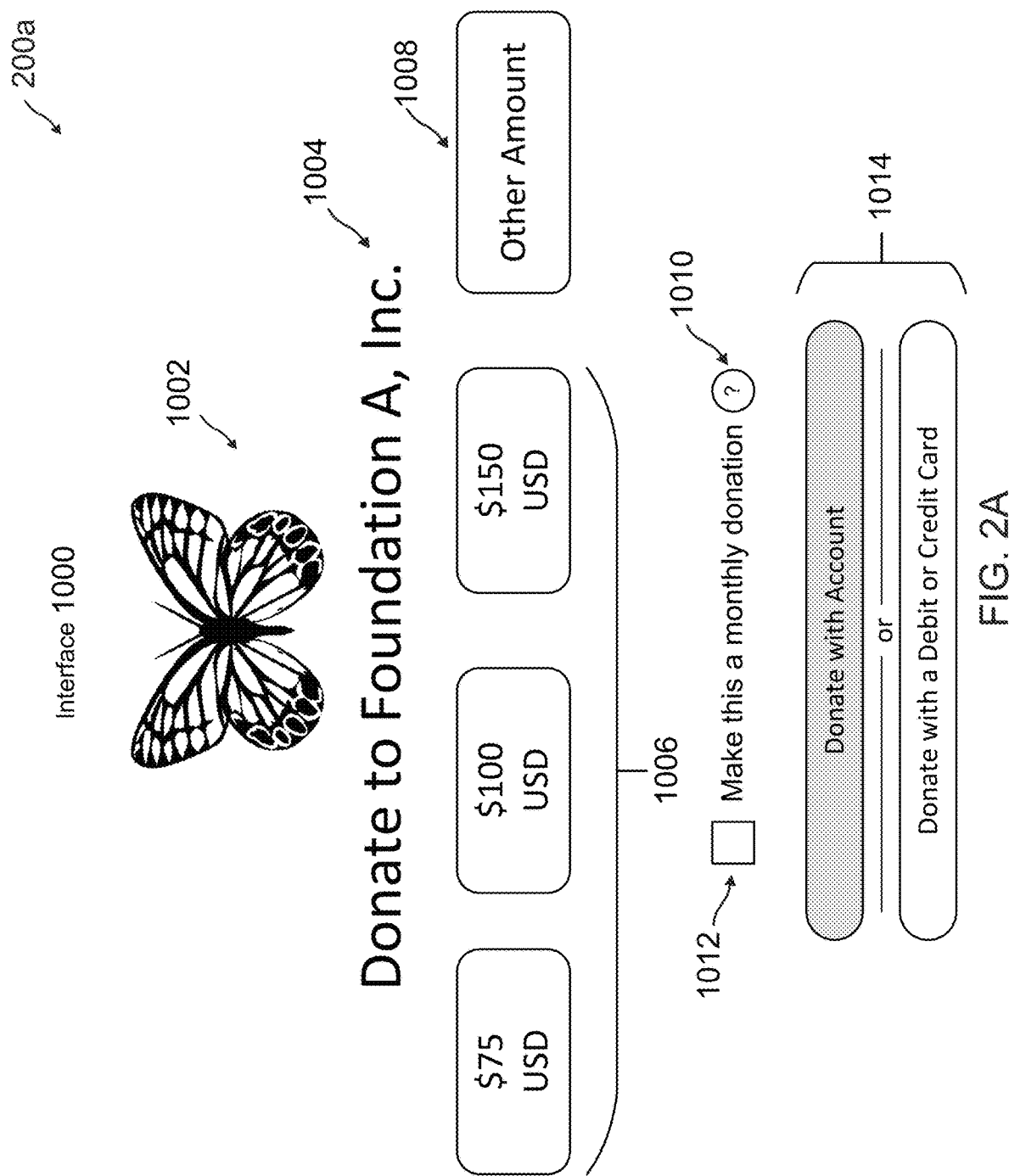
FIG. 2A is a first exemplary interface for an entity
dynamically displayed to a user based on data intelligently
determined using a machine learning engine, according to an
embodiment.

FIG. 2A is a first exemplary interface for an entity dynamically displayed to a user based on data intelligently determined using a machine learning engine, according to an embodiment. Environment 200a includes an interface 1000 displayed by a device, such as user device 110 in system 100 of FIG. 1. In this regard, interface 1000 may be displayed based on user and entity data processed by a machine learning engine to dynamically suggest amounts for a voluntary payment. This process may be provided by an entity through a platform or portal provided by the entity or may be provided by a service provider to entities.

In interface 1000, a user may view a voluntary payment portal 1002 to an entity 1004 shown as "Foundation A, Inc." Voluntary payment portal 1002 may be used by users to perform voluntary payments to entity 1004 based on amounts 1006 dynamically suggested to the user from user data and entity data. Interface 1000 may be accessed by causing an application (e.g., a browser or dedicated application) to navigate to voluntary payment portal 1002 and access the interface data for display. In some embodiments, amounts 1006 may be determined by correlating and averaging transaction history data of voluntary payments may be a user to one or more entities (including entity 1004) with transaction history data of voluntary payment received by the one or more entities. This data may also be weighed based on factors associated with the entity, the user, and/or the voluntary payment. For example, user factors may include particular goals, donation trends, purchasing trends, available assets, and/or required debts by the user. The entity factors may correspond to particular trends for voluntary payments and events of the charity. The voluntary payment may also be associated with a particular event, time of year, and/or pattern or trend in payments by other users. A determined or suggested voluntary payment amount may also be based on how many other users the user knows are nearby and where the user and the other known users are at. In this example, the user may be having dinner with his friends and they decide to make a voluntary payment to the performing arts organization sponsoring a performance they are about to see. One or more amounts may then be higher than if the user was by himself based on the system determining or predicting the user may be willing to make a higher voluntary payment amount because of other known users nearby and a context of the voluntary payment.

Amounts 1006 may include 3 amounts determined based on a first quartile of the correlated data, a median of the correlated data, and a third quartile of the correlated data. As shown on interface 1000, the first quartile corresponds to a $150 voluntary payment, the median corresponds to a $100 voluntary payment, and the third quartile corresponds to a $75 voluntary payment. Amounts 1006 may be determined based on predicted sections of the correlated data that may be desirable for the entity and/or the user or may be set by the entity and/or user for their preferred voluntary payment amounts. For example, a user may request to view one or more average amounts, such as a median of correlated data. When performing an entity or charity-specific recommendation for entity 1004, initially unsuccessful and/or revoked voluntary payments may be removed from the entity data. Additionally, an entity that receives less than a certain number of voluntary payments over a given time period (e.g., a time period that the system analyzes) may be removed. For example, the data set for an entity with a small number of voluntary payment may have data points that are divergent and therefore may not be representative. Those entities having small traffic of voluntary payments may be instead assigned default values specific to regional voluntary payment statistics for where the entity is location and/or where the event for the entity/voluntary payment is occurring.

Additionally, outlier entities that receive more than a certain number and/or size (e.g., payment amount) of voluntary payments over a time period that the system is analyzing may further be removed. For example, any large or small voluntary payments that are over/under a certain amount may introduce bias to the system when calculating the mean/median values, and thus, such values may be removed. This prevents suggestion of amounts that may be widely divergent from the common amount. Thus, if 90-95% of amounts are less than a certain amount (e.g., $250), outlier that are far divergent or otherwise different from this certain amount may be removed. This may also include removing those entities that receive many large donations while also receiving smaller donations so that those entities do not affect the other standard entities that commonly receive payments within a certain range. For example, those large entities receiving many voluntary payments of thousands of dollars may skew the value for smaller entities, and thus may be removed as outliers. Outliers may be detected by determining an interquartile range (IQR) by subtracting the first quartile (Q1) from the third quartile (Q3) of values. Any number smaller than the first quartile minus 1.5 times the interquartile range (e.g., Q1−1.5×IQR) or greater than the third quartile plus 1.5 times the interquartile range (e.g., Q3+1.5×IQR) may be an outlier amount. In some embodiments, a clustering algorithm (e.g., k-means clustering, means-shift clustering, density-based clustering, hierarchical clustering, etc.) may be used with machine learning engines to remove the outliers and filter noisy data.

Once the data has been parsed to remove outliers, the first quartile, third quartile, mean, and median may be calculated from the remaining data. Seasonal data may further be used as data input and may be a factor that influences selection of the time period for the data and/or the calculation of the amounts from the data. Moreover, past user inputs associated with selection of one or more amounts 1006 may be used as a factor during selection of amounts 1006. For example, if users tend to select one of amounts 1006 over the other amounts, then the data may be weighted towards that amount during calculation of amounts 1006. Additionally, a user-specific recommendation may be determined. When determining a user-specific recommendation, voluntary payment history data from a transaction history of the user may be considered and processed. The data may be segregated by specific entities, for example, if specific entities, types of entities, or groups of entities have significantly different past voluntary payment amounts (e.g., giving to animal specific charities is more or less frequent, or the size of amount is higher or lower, than the Red Cross®). Thus, amounts 1006 may be determined using general voluntary payments of the user or specific payments to certain entities.

Outliers for user data may be removed in a similar fashion to as discussed above for entity-specific recommendation data, for example, using an IQR and/or clustering algorithm to clean up noise in the data. Thus, only voluntary payments of a certain amount and/or range of amounts may be considered. Seasonal data may also affect determination of the time period, data amounts, and/or amounts 1006. For example, users may be more prone to giving during holidays or on an anniversary (e.g., death of person or historical event). The user may also set specific giving or payment goals for voluntary payments within a time period, such as over a year. This may be utilized as a weight factor to determine amounts 1006. Additionally, if the user does not have a transaction history with the system or the transaction history is minimal, those users may be filtered, and the user may instead be correlated to similar users (e.g., by region, type of charity, income bracket, etc.) so that other user-specific data may be determined in the absence of a transaction history. When performing the entity and/or user-specific recommendation, a score is calculated along with amounts 1006. The score for various amounts may be calculated using the IQR and/or the clustering, as discussed above, which may be used to determine output of amounts 1006. The amounts may be adjusted when training a machine learning engine that utilizes the aforementioned processes when receiving feedback (e.g., selection of amounts 1006. Thus, the machine learning algorithm may be developed through training the machine learning algorithm based on the entity and user-recommendation, a combined correlation of those amounts, and/or feedback to the system based on selection of amounts 1006 and/or other entered amounts to variable payment field 1008.

Once the entity-specific and user-specific recommendations are determined, the data may be correlated and processed to determine amounts 1006 and/or one or the recommendations may be selected for amounts 1006 (e.g., based on system preferences, user/entity preferences, etc.). In some embodiments, amounts 1006 may also be rounded and/or adjusted to a closest dollar amount and/or common rounded up or down amount (e.g., $75 over $77.8 or similar). Interface 1000 may further provide a variable payment field 1008 where a user may enter a particular amount that the user would like to donate. The user may then selection from additional options on interface 1000 to complete a voluntary payment to entity 1004. For example, a box 1012 may be checked to make a monthly voluntary payment from the selected amount from amounts 1006 and variable payment field 1008. A help icon 1010 may assist the user in further transaction processing or other information required to process the voluntary payment. Once the user has determined an amount of a voluntary payment, the user may select one or more of payment processes 1014 to process the voluntary payment to entity 1004. Amounts 1006 may be used to link to a process and/or select an amount that is entered for electronic transaction processing on selection of payment processes 1014. Thus, the interface elements displaying amounts 1006 may directly link to a process for electronic transaction processing or may be used to enter transaction data automatically to the process.

Depending on selection of amounts 1006 and variable payment field 1008, amounts 1006 may be updated in future iterations of display through interface 1000 or another similar interface. For example, the selected one of amounts 1006 may be used to determine if the user chooses a first quartile, median, or third quartile of the correlated data to provide a payment to the entity. During the future displays, the user may be presented with an interface having the same average value from another set of correlated data from the user's data and the entity or another entity's data. Thus, the correlated data may be averaged based on a similar average from future correlated data.

Figure 2B:
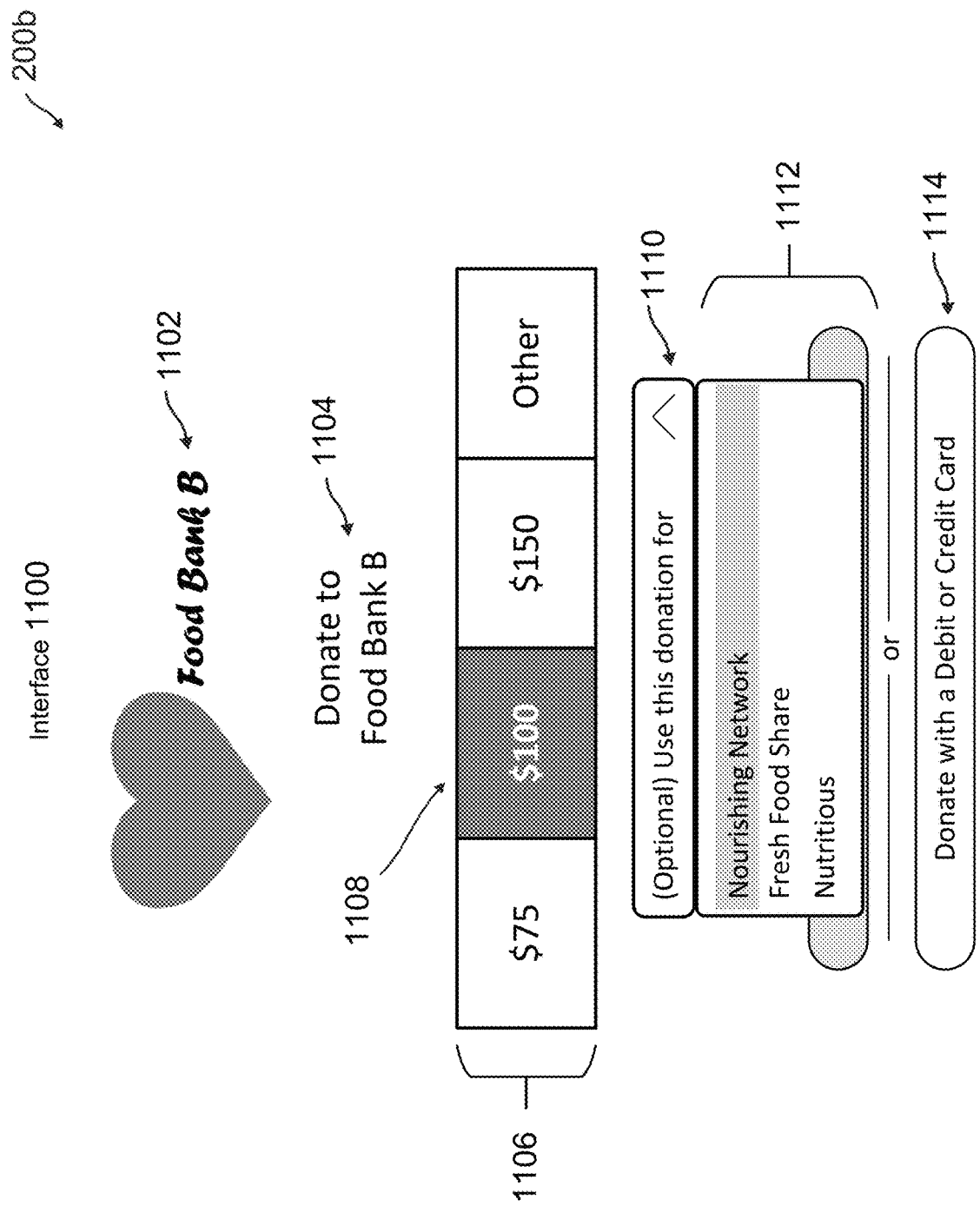
FIG. 2B is a second exemplary interface for an entity
dynamically displayed to a user based on data intelligently
determined using a machine learning engine, according to an
embodiment.

FIG. 2B is a second exemplary interface for an entity dynamically displayed to a user based on data intelligently determined using a machine learning engine, according to an embodiment. Environment 200b includes an interface 1100 displayed by a device, such as user device 110 in system 100 of FIG. 1. In this regard, interface 1000 may be displayed based on user and entity data processed by a machine learning engine to dynamically suggest amounts for a voluntary payment. The machine learning engine may dynamically suggest the amounts through a supervised, unsupervised, and/or reinforcement learning using user and/or entity data, as well as seasonal factors, giving goals, and other weights. When training the algorithm of the machine learning engine, an entity or charity-specific recommendation, a user-specific recommendation, and/or both (e.g., through processing of both the data) may be determined using the aforementioned processes discussed with regard to FIG. 2A. For example, three amounts may be calculated, as shown in FIGS. 2A and 2B, by using an IQR and the aforementioned equations and/or through a clustering algorithm to cluster particular amounts and remove noise. The equations may correspond to value from the voluntary payment history (over a time period) for the entity and the user, and may include a median value times 1.5, a mean value, and/or a mean value times 1.5. Each of the values may be rounded to the nearest dollar, the near 5, or other nearest value (e.g., nearest $10, $100, etc.). This process may be provided by an entity through a platform or portal provided by the entity or may be provided by a service provider to entities.

In interface 1100, a user may view a voluntary payment portal 1102 to an entity 1104 shown as "Food Bank." Voluntary payment portal 1102 may be used by users to perform voluntary payments to entity 1104 based on amounts 1106 dynamically suggested to the user from user data and entity data. Similar to interface 1000, interface 1100 may be accessible through a device application when navigating to voluntary payment portal 1102 for entity 1104. Additionally, interface 1100 displays amounts 1106 determined based on user and entity data, which may be dynamically suggested depending on the particular user and/or entity 1104. Similarly, amounts show three amounts determined based on a 25%, 50%, and 75% amount using an IQR and/or clustered data to remove outliers and noise from the user and/or entity data and determining the first quartile, the third quartile, and the median of the data. The amounts may correspond to a specific quartile of the data, a mean/median of the data, or other portion of the data.

In some embodiments, the selection of the amounts may include taking the mean or median amounts and multiplying by an amount (e.g., 1.5, 0.75) and performing rounding to the nearest selected amount. In some embodiments, the user data and/or the entity data may be more highly weighted when correlating the amounts after filtering noise and outliers from the data. For example, a user-specific recommendation may be more highly weighted in the user data when suggesting the amounts due to the likelihood of the user providing voluntary payments in a similar fashion to their historical data. The entity data may also be weighed and/or filtered to look at previous voluntary payments that are similar to the user's voluntary payments and reducing noise and outliers further to consider amounts that are within the user's price or payment range. Similarly, the correlation of the data may be affected by other factors, such as seasonal trends, type of charity, cause or event occurring for the voluntary payment, or other data that may increase or decrease the determination of amounts 1106.

Interface 1100 further provides additional options for transaction processing to entity 1104. For example, selected amount 1108 is shown highlighted in interface 1100 so that the corresponding value of $100 is entered to transaction processing for a voluntary payment to entity 1104. This may be automatically entered through designation of selected amount 1108 so that the user is not required to enter input of the amount and instead may more quickly process a transaction to entity 1104. Additionally, menu 1110 may be used to select a cause 1112 from a list, where selected amount 1108 may be designated for cause 1112 to entity 1104. Payment processes 1014 may then be used to designate a funding source to process selected amount 1108 to entity 1104. Once the options are selected, electronic transaction processing may then be completed to provide the voluntary payment to entity 1104.

Figure 3:
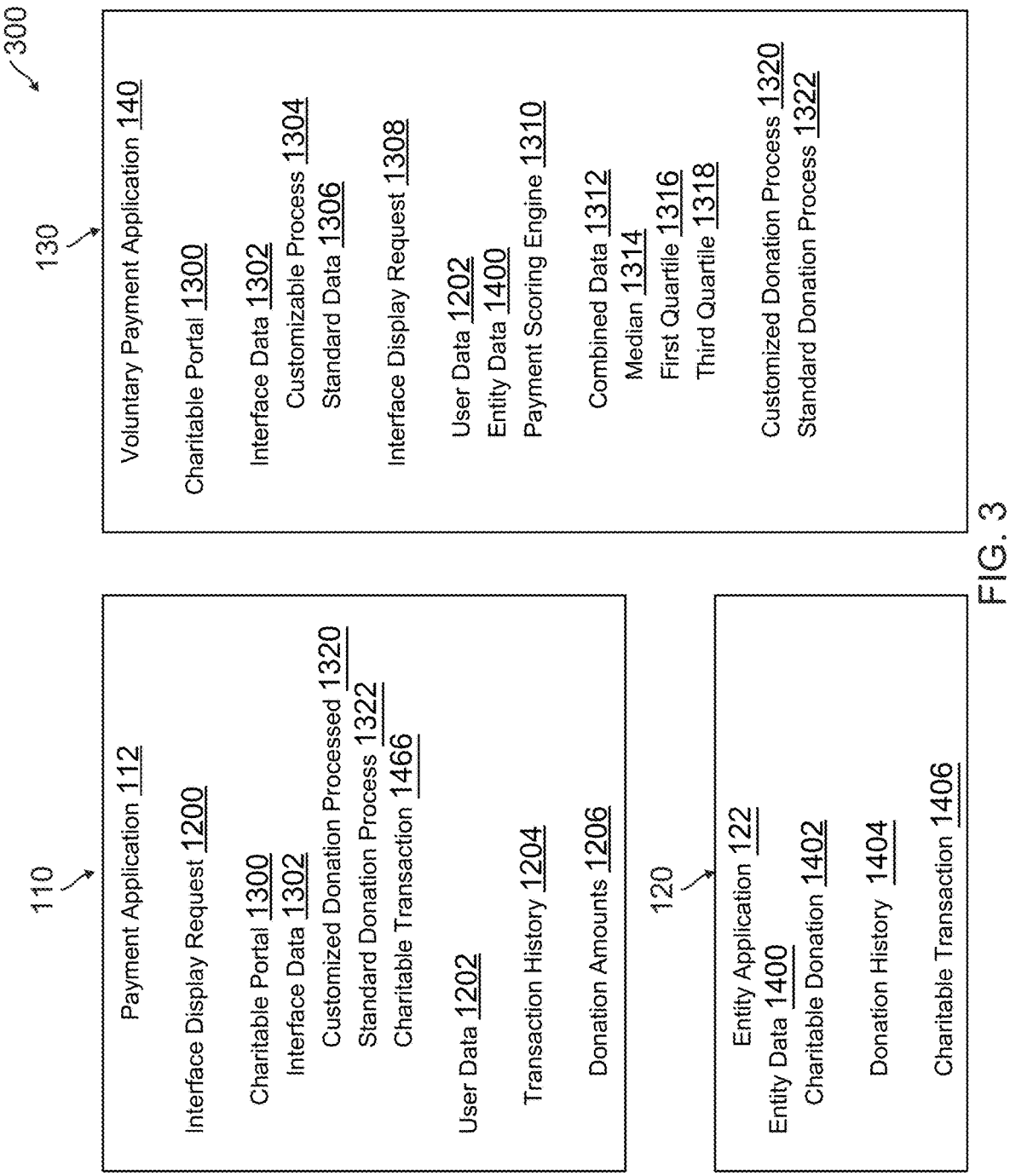
FIG. 3 is an exemplary system environment where a user
device, an entity server, and a service provider server may
interact to dynamically display interface data based on
intelligent correlations of past data, according to an embodiment.

FIG. 3 is an exemplary system environment where a user device, an entity server, and a service provider server may interact to dynamically display interface data based on intelligent correlations of past data, according to an embodiment. System 300 of FIG. 3 includes user device 110, entity server 120, and service provider server 130 discussed in reference to system 100 of FIG. 1. In this regard, user device 110, entity server 120, and service provider server 130 may provide one or more processes to suggest amounts dynamically for voluntary payments based on user data and entity data available to service provider server 130.

User device 110 and entity server 120 may provide user data and entity data, respectively, that are used to determine suggested voluntary payment amount(s) by service provider server 130. In some embodiments, service provider server 130 may also access the user and entity data from data stored by service provider server 130. User device 110 may initiate the process to receive an intelligent suggestion of voluntary payment amounts by processing an interface display request 1200 through payment application 112 for display of an interface to make a voluntary payment to an entity associated with entity server 120. The interface may be requested through a charitable portal 1300 by payment application 112. When accessing the interface and processing interface display request 1200, user data 1202 may be provided to service provider server 130 for processing, where user data 1202 includes a transaction history 1204 of donation amounts 1206. User data 1202 may include historical information of voluntary payments made to the entity or another entity by the user, which may be particular to certain times, trends, locations, with certain users known to the user, and/or other information of transaction processing with those entities or types of entities. This user data may be combined and correlated with entity data.

Entity server 120 may include entity application 122 that may provide entity data with additional entity transaction history information stored by or available to service provider server 130. Entity application 122 may provide entity data 1400 having charitable donations 1402 made by users to the entity associated with entity server 120. Charitable donations 1402 may include a donation history 1404 that may include all voluntary payments to the entity or a portion of the voluntary payments limited by some factor, such as time, event, trend, cause, etc. Charitable donations 1402 may be stored to entity service 120 based on transaction processing, records of voluntary payments, and/or or historical data stored by entity server 120. In some embodiments, charitable donations 1402 may also be generated through interactions with service provider server 130, such as a transaction of voluntary payments and donations processed by service provider server 130 on behalf of the entity. Entity server 120 may also generate donation history 1404 based on interactions with service provider server 130, such as transaction processed for voluntary payments by service provider server 130. In some embodiments, additional entity data may be provided for the voluntary payment, such as an event, cause, or designation for the voluntary payment.

Service provider server 130 may then execute voluntary payment application to process the received and/or accessed user/entity data and determine interface data 1032 for display in response to interface display request 1200. Interface data 1302 may be displayed based on a customizable process 1304 having dynamically adjusted and/or entered data based on user data 1202 and entity data 1400. Additionally, standard data 1306 may be displayed in response to interface display request 1308, which may be static data that is not dynamically changed for each interface access and display request. Voluntary payment application 140 executes payment scoring engine 1310 to determine the dynamically suggested amounts through analysis of user data 1202 and entity data 1400, for example, by combining similar or correlated transactions from the transaction histories and removing any outliers. Combined data 1312 corresponds to this processed data, and may then be analyzed to determine a median 1314, a first quartile 1316, and a third quartile 1318. Using these amounts, customizable process 1304 may be updated and changes to display each of the amounts and a customized donation process 1320 may be output through interface data 1302 on user device 110. Additionally, interface data 1302 may provide a standard donation process 1322 that may revert customized donation process 1320 to a standard interface and/or allow the user to enter a variable amount set by the user instead of determined using payment scoring engine 1310. After selection of an amount, charitable transaction 1406 may then be processed for the selected amount.

Figure 4:
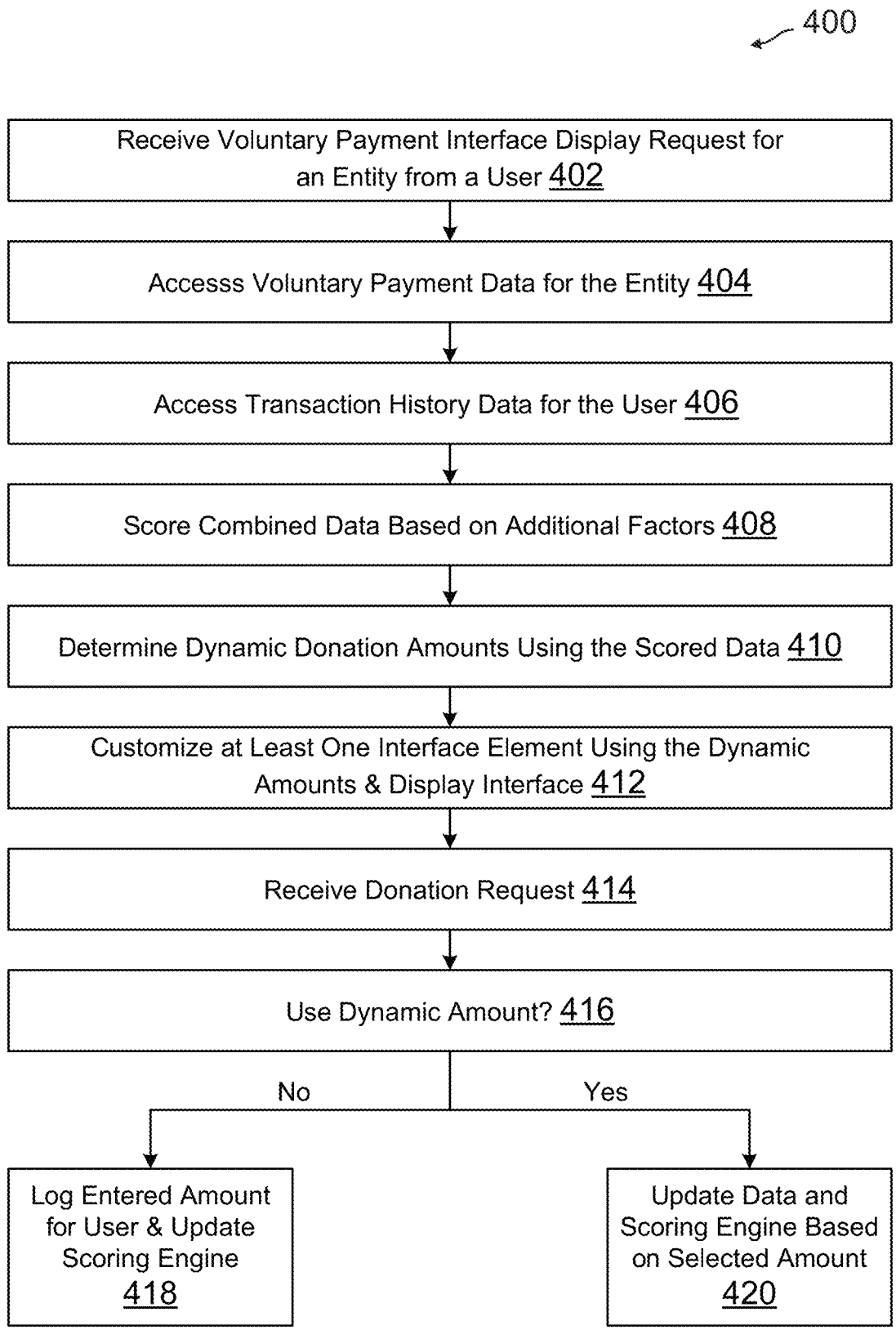
FIG. 4 is a flowchart of an exemplary process for intelligent interface displays based on past data correlations,
according to an embodiment.

FIG. 4 is a flowchart of an exemplary process for intelligent interface displays based on past data correlations, according to an embodiment. Note that one or more steps, processes, and methods described herein of flowchart 400 may be omitted, performed in a different sequence, or combined as desired or appropriate.

At step 402 of flowchart 400, a display request for a voluntary payment interface is received for an entity from a user. This display request may be processed by an application of a user device when the user navigates to a particular portal and requests to view an interface to perform a voluntary payment to the entity. Additionally, a service provider server may process the request in order to provide a customized interface to the user that has dynamically determined and adjusted values for the voluntary payment. Thus, in response to the access and display request, voluntary payment data for the entity is accessed at step 404, where the voluntary payment data includes business or charity information for the entity and transaction processing history information for voluntary payment previously made to the entity. For example, a past payment history of voluntary payments received by the entity from the user and/or other users may be accessed by the service provider through one or more accounts of the entity. This information may location, country, time, and/or event limited so that the entity information may be more specific to a certain parameter. The entity data may also be specific to a particular event occurring at the time, which the entity may be associated with (e.g., a holiday, disaster, etc.). The entity data may also be associated with tax or income brackets of the users providing the voluntary payments.

At step 406, the service provider accesses transaction history data for the user, which may include account data for an account of the user with the service provider. The account data may include a past voluntary payment history of payments provided by the user through their account to the entity or another entity, including a same type of entity, such as performing arts foundations, children's foundations, and the like. The transaction history may also include other payments or financial information (e.g., assets, debts, upcoming payments, etc.) that may be associated with the account, and may also be specific to a time and/or location of the payments, an event associated with the payments, and/or an entity type associated with the payments to the entity and/or the other entities. Particular trending data of payments may also be included in the user data. The user may also set a goal for voluntary payments, which may be included with the data. Once the data is collected, the data is processed by combining the data and generating correlations between payments in the data, at step 408.

The combined data may be scored depending on particular factors and weights so that certain transaction data weight in the combined data is increased or decreased based on a score engine and algorithm utilized by the service provider. Some of the weights may be based on the user and entity data, such as trends within the data, specific times of the data and a present voluntary payment through the voluntary payment interface, and/or voluntary payment goals by the user and entity. For example, time of year and/or seasonal factors may influence voluntary payments, such as payment during a holiday (e.g., Thanksgiving and/or Christmas). The amounts may be dynamically modified based on seasonal trends and the data may be scored and weighted similar to other voluntary payments based on the time of year. The voluntary payment amounts over a year may be tracked and particular trends may be identified, which may be specific to the user and/or charity. Thus, the amounts may be weighed based on seasonal increases and/or decreases in processed voluntary payments to the entity and/or other entities.

User's transaction history and trends in their transaction history may also affect determination of the payment amounts. For example, if the user processes additional payments or increases payment amount at a certain time of year (e.g., near a birthday, anniversary of an event, receiving a tax refund or bonus, etc.), the data may be weighted to consider those factors. Moreover, a specific event and/or a type of the event associated with the voluntary payment may affect the scoring, such as by weighing certain donations and/or charities higher or lower depending on past payments and the amounts of such payments. Similarly, a type of entity/charity and cause with the entity may similarly be used to filter the user and/or charity data and increase or decrease the score and amount determined for the dynamic suggestion of payment amount. Other factors may also be used to filter the data and/or increase/decrease the amounts, such as current user assets and/or debts, incoming payments to the user, giving goals by the user over a time period, etc.

Dynamic donation data to the entity from the user is determined using the scored data, at step 410. These dynamic amounts may be customized based on the scored combined data by the machine learning engine that applies particular selection processes to the scored data. The dynamic amounts may be one or more amounts based on particular averages, portions, amounts, or thresholds of the scored data. Additionally, the engine may determine the amounts based on past user selections of voluntary amounts, for example, if the user generally selects a median amount, a lowest or highest displayed amount, or an amount for a particular threshold of the data. At step 412, at least one interface element is customized using the dynamic amounts and a display interface. The dynamic amounts determined at step 410 may be input to an interface that is customized for the user, where the interface include elements or field for display of the data. A donation request is received, at step 414, for an amount entered or selected using the dynamic interface display. The service provider may then determine whether the donation request uses one of the dynamic amounts calculated for the entity and the user, at step 416. If a dynamic amount is not selected, the service provider's engine for determining the dynamic amounts may be updated, at step 418, and the entered amount is logged for the user for use in future data display requests for donation amounts or for use in determining a future suggested amount. However, if the dynamic amount is selected, the engine is updated based on the selected amount and data for the user and the entity is updated, at step 420.

Figure 5:
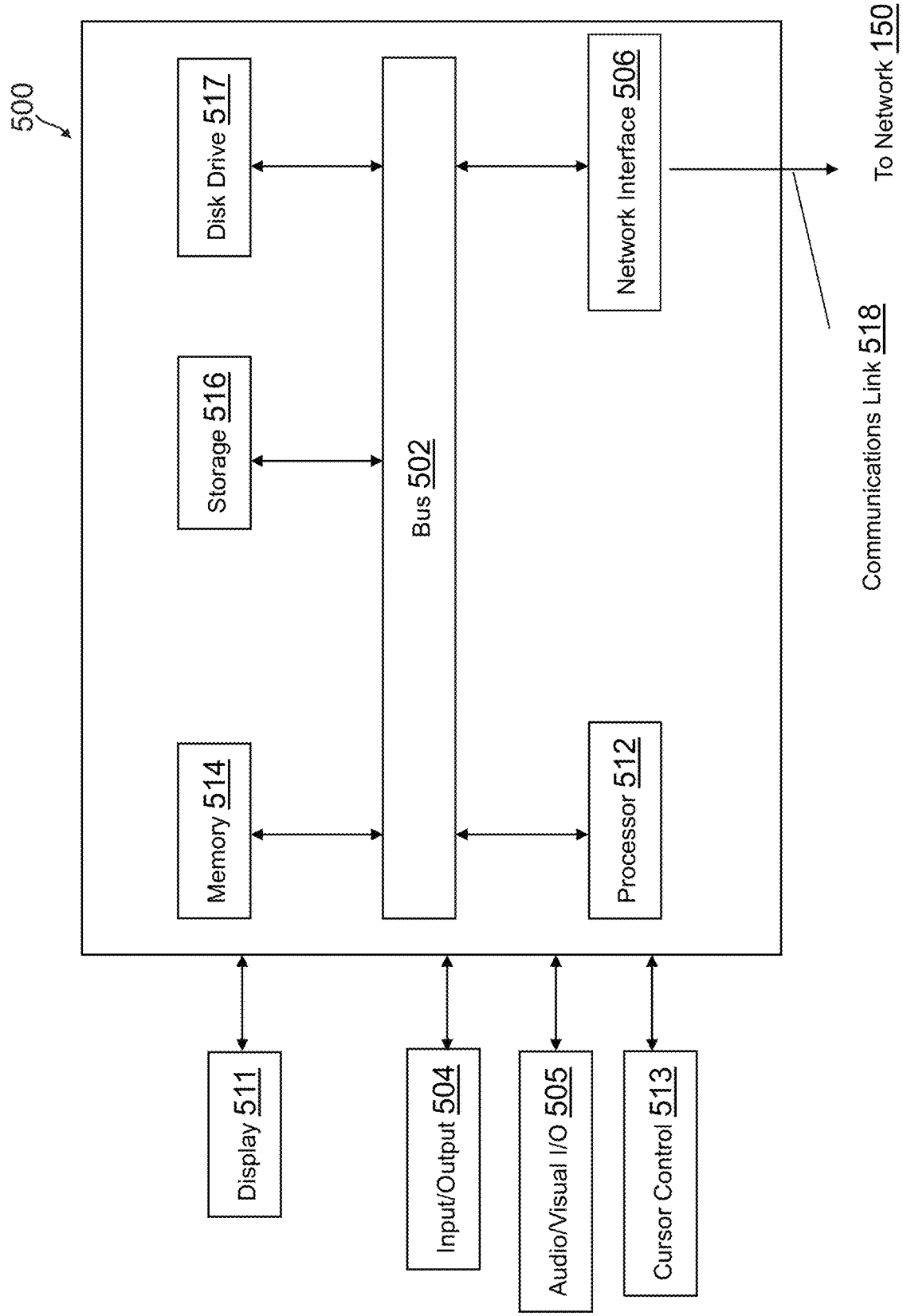
FIG. 5 is a block diagram of a computer system suitable
for implementing one or more components in FIG. 1,
according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, through a graphical user interface of a computing device associated with a user, an indication for submitting a voluntary payment to an entity;
   determining past user transactions for the user over a time period and previous voluntary payment donations received by at least one other entity over the time period;
   calculating, by a payment scoring engine comprising at least one machine learning operation for predictive payment scoring of suggested payment amounts, an entity payment average of the previous voluntary payment donations over the time period;
   comparing, by the payment scoring engine, the previous voluntary payment donations to a subset of the past user transactions;
   calculating, by the payment scoring engine, a user payment average for the subset of the past user transactions over the time period;
   determining, by the payment scoring engine, a plurality of voluntary payment amounts for the user to the entity based on the entity payment average and the user payment average;
   providing a plurality of selectable amount buttons based on the plurality of voluntary payment amounts for processing of the voluntary payment to the entity;
   displaying, on the computing device, the plurality of selectable amount buttons in an interface accessed by the computing device;
   receiving a selection of one of the plurality of selectable amount buttons through the computing device; and
   in response to the selection, processing the voluntary payment to the entity using a user account of the user.

2. The method of claim 1, wherein the payment scoring engine comprises a plurality of weights for determination of the plurality of voluntary payment amounts, and wherein the plurality of weights are associated with at least one of a time of year, a location, a type of the computing device, a portal used to access the interface, or an event associated with the voluntary payment to the entity.

3. The method of claim 1, wherein the plurality of voluntary payment amounts comprise three voluntary payment amounts based on a top quartile, a median, and a bottom quartile of the past user transactions and the previous voluntary payment donations.

4. The method of claim 3, further comprising:
   removing outlier transactions from the past user transactions and the voluntary payment donations;
   correlating the past user transactions and the voluntary payment donations based on the removing; and
   determining the top quartile, the median, and the bottom quartile based on the correlating.

5. A non-transitory machine-readable medium having stored thereon machine-readable instructions executable to cause a machine to perform operations comprising:
   accessing a user transaction history for a user and a voluntary payment history for an entity;
   calculating, by a payment scoring engine, an entity payment average for a portion of transactions to the entity in the voluntary payment history over a time period, wherein the payment scoring engine comprises at least one machine learning operation for predictive payment scoring of suggested payment amounts;
   comparing, by the payment scoring engine, the portion of the entity transactions to a subset of user transactions from the user transaction history;
   calculating, by the payment scoring engine, a user payment average for the subset of the user transactions over the time period;
   determining, by the payment scoring engine, average transaction amounts from a first quartile of payment for the entity transactions and the user transactions, a median of the payments for the entity transactions and the user transactions, and a third quartile of the payments for the entity transactions and the user transactions based on the entity payment average and the user payment average;
   determining a first payment amount, a second payment amount, and a third payment amount for voluntary payments to the entity by the user based on the average transaction amounts; and
   outputting, to a device of the user, interface elements of a transaction interface for the entity based on the first payment amount, the second payment amount, and the third payment amount, wherein the transaction interface dynamically outputs the interface elements specific to the user.

6. The non-transitory machine-readable medium of claim 5, wherein prior to the comparing, the operations further comprise:
   determining an outlier transaction in the voluntary payment history of the entity;
   determining that the outlier transaction requires removal based on the user transaction history; and
   removing the outlier transaction before the comparing.

7. The non-transitory machine-readable medium of claim 5, wherein the average transaction amounts are further based on at least one of an event associated with the entity or a season associated with the user.

8. A system comprising:
   [i] a non-transitory memory storing instructions; and
   [ii] one or more hardware processors coupled to the non-transitory memory and configured to read the instructions from the non-transitory memory to cause the system to perform operations comprising:
   [1] receiving an interface display request from a computing device of a user to process a voluntary payment to an entity;
   [2] accessing entity information for the entity based on the interface display request to process the voluntary payment;
   [3] calculating, based on the entity information, an entity average for past entity payment amounts received by the entity over a time period;
   [4] accessing user information for the user from an account of the user with the system;

[5] comparing, using a payment scoring engine comprising at least one machine learning operation for predictive payment scoring of suggested payment amounts, the past entity payment amounts to a subset of past user payment amounts paid by the user;
[6] calculating, based on the user information, a user quartile for the subset of the past user payment amounts over the time period;
[7] determining, using the payment scoring engine, a first payment amount dynamically suggested for the voluntary payment by the user based on the entity average and the user quartile;
[8] generating an interface specific to the user, wherein the interface displays the first payment amount;
[9] providing a process for electronic transaction processing of the first payment amount from the user to the entity in the interface; and
[10] in response to the interface display request, transmitting the interface displaying the first payment amount and the process to the computing device of the user.

9. The system of claim 8, wherein the entity information is specific to at least one of a first country of the entity or a second country of the user.

10. The system of claim 8, wherein the user information comprises a past voluntary payment history of the past user payment amounts provided by the account to at least one of the entity or another entity, wherein the past voluntary payment history is specific to one of a time of the past user payment amounts, a location of the past user payment amounts, an event associated with the past user payment amounts, or an entity type associated with the past user payment amounts and the entity.

11. The system of claim 10, wherein the user information further comprises at least one of a transaction history of purchases by the user using the account or a remaining payment amount to reach for a voluntary payment goal set by the user for a second time period.

12. The system of claim 11, wherein the operations further comprise:
weighing, by the payment scoring engine, the transaction history based on a recency of each of the purchases in the transaction history; and
determining voluntary payment opportunities for the user to meet the remaining payment amount before expiration of the second time period,
wherein the first payment amount is determined by the payment scoring engine based on the weighing the transaction history and the voluntary payment opportunities.

13. The system of claim 8, wherein the operations further comprise:
determining a type of event associated with the entity, wherein the interface provides the electronic transaction processing to an entity account of the entity associated with the type of event,
wherein the entity information comprises voluntary payments specific to the type of event, and wherein the first payment amount is determined by the payment scoring engine based on the voluntary payments.

14. The system of claim 8, wherein the operations further comprise:
determining seasonal voluntary payment trends by users to the entity based on the entity information; and
wherein the first payment amount is further determined by the payment scoring engine based on the seasonal voluntary payment trends.

15. The system of claim 8, wherein the determining the first payment amount by the payment scoring engine comprises:
combining user transactions of the user information with entity transactions of the entity information,
wherein the first payment amount is further determined based on the combining.

16. The system of claim 1, wherein the operations further comprise:
determining a second payment amount and a third payment amount based on the comparing, wherein the first payment amount comprises a median payment amount of the comparing, wherein the second payment amount comprises a first quarter payment amount based on the comparing, and wherein the third amount comprises a second quarter payment amount different than the first quarter payment amount based on the comparing; and
displaying the second payment amount and the third payment amount with the first payment amount on the interface.

17. The system of claim 16, wherein each of the first payment amount, the second payment amount, and the third payment amount on the interface links to a process to provide electronic transaction processing for the each of the first payment amount, the second payment amount, and the third payment amount from the user to the entity.

18. The system of claim 16, wherein the operations further comprise:
removing, by the payment scoring engine, outlier transactions from the user information and the entity information, wherein the outlier transactions are over a maximum payment amount or under a minimum payment amount.

19. The system of claim 8, wherein the operations further comprise:
providing an interface element on the interface for entry of a variable payment amount from the user to the entity.

20. The system of claim 19, wherein the operations further comprise:
in response to receiving the variable payment amount entered by the user, updating the user information based on the variable payment amount, wherein a future payment amount to the entity is dynamically suggested based on at least the variable payment amount.

* * * * *